United States Patent
Kudou et al.

(10) Patent No.: US 10,699,495 B2
(45) Date of Patent: Jun. 30, 2020

(54) DISPLAY DEVICE OF VEHICLE

(71) Applicant: MAZDA MOTOR CORPORATION, Aki-gun, Hiroshima (JP)

(72) Inventors: Tsuneo Kudou, Hiroshima (JP); Hiroyuki Watase, Hiroshima (JP); Fumiaki Sugino, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/761,068

(22) PCT Filed: Feb. 6, 2017

(86) PCT No.: PCT/JP2017/004188
§ 371 (c)(1),
(2) Date: Mar. 16, 2018

(87) PCT Pub. No.: WO2017/145724
PCT Pub. Date: Aug. 31, 2017

(65) Prior Publication Data
US 2018/0268620 A1    Sep. 20, 2018

(30) Foreign Application Priority Data
Feb. 22, 2016   (JP) .................. 2016-031169

(51) Int. Cl.
*G07C 5/00*     (2006.01)
*F01M 11/10*    (2006.01)
(Continued)

(52) U.S. Cl.
CPC .............. *G07C 5/006* (2013.01); *B60K 35/00* (2013.01); *B60K 37/02* (2013.01); *F01M 11/10* (2013.01);
(Continued)

(58) Field of Classification Search
CPC combination set(s) only.
See application file for complete search history.

(56) References Cited

U.S. PATENT DOCUMENTS 6,459,969 B1 * 10/2002 Bates ............... G07C 5/006
                                                         123/436
7,571,032 B2 * 8/2009 Kanno ............. G01D 7/002
                                                          701/21
(Continued)

FOREIGN PATENT DOCUMENTS

JP    S59230109 A    12/1984
JP    200340090 A     2/2003
(Continued)

OTHER PUBLICATIONS

ISA Japan Patent Office, International Search Report Issued in PCT Application No. PCT/JP2017/004188, dated Mar. 21, 2017, WIPO, 2 pages.

*Primary Examiner* — Thomas G Black
*Assistant Examiner* — Ana D Thomas
(74) *Attorney, Agent, or Firm* — Alleman Hall Creasman & Tuttle LLP

(57) ABSTRACT

Provided as display portions configured to display maintenance related information pieces about a plurality of maintenance items of a vehicle are: a first display portion configured to, when at least one of the plurality of maintenance items is in a predetermined maintenance period, display the maintenance related information piece about the maintenance item that is in the predetermined maintenance period, the predetermined maintenance period including a predetermined maintenance timing and periods before and after the predetermined maintenance timing; and a second display portion configured to, when none of the plurality of maintenance items is in the maintenance period, display (Continued)

only the information piece about a nearest one of the maintenance timings of the plurality of maintenance items.

4 Claims, 10 Drawing Sheets

(51) Int. Cl.
| | |
|---|---|
| *B60K 37/02* | (2006.01) |
| *B60K 35/00* | (2006.01) |
| *G01M 17/007* | (2006.01) |
| *G01F 23/00* | (2006.01) |
| *G01M 15/04* | (2006.01) |
| *G07C 5/08* | (2006.01) |
| *F01P 11/16* | (2006.01) |

(52) U.S. Cl.
CPC ....... *G01F 23/0076* (2013.01); *G01M 15/048* (2013.01); *G01M 17/007* (2013.01); *G07C 5/0825* (2013.01); *B60K 2370/168* (2019.05); *B60K 2370/178* (2019.05); *B60K 2370/193* (2019.05); *F01M 2011/14* (2013.01); *F01P 11/16* (2013.01)

(56) References Cited

U.S. PATENT DOCUMENTS

| | | | | |
|---|---|---|---|---|
| 2005/0216150 | A1* | 9/2005 | Binderberger | B60R 16/0234 701/29.4 |
| 2010/0127847 | A1* | 5/2010 | Evans | G06F 3/04817 340/461 |
| 2010/0174443 | A1* | 7/2010 | Kubota | G07C 5/006 701/29.5 |
| 2013/0325541 | A1* | 12/2013 | Capriotti | G06Q 10/20 705/7.21 |
| 2017/0234771 | A1* | 8/2017 | Watase | G01K 13/02 374/145 |

FOREIGN PATENT DOCUMENTS

| | | |
|---|---|---|
| JP | 2008308075 A | 12/2008 |
| JP | 2011246048 A | 12/2011 |

* cited by examiner

DISPLAY DEVICE OF VEHICLE

TECHNICAL FIELD

The present invention relates to a display device of a vehicle, the display device displaying information pieces about maintenance of the vehicle.

BACKGROUND ART

A display device of a vehicle is conventionally known, which displays information pieces about various maintenance items, such as a periodic inspection, a tire rotation, and an oil change, of a vehicle. When a maintenance timing preset for each maintenance item has come or comes near, this type of display device can display the information piece about it.

Further, for users who want to make plans of the maintenance earlier, there is a need to display the information pieces about the maintenance before the maintenance timing comes near. To satisfy such need, a display device of a vehicle disclosed in PTL 1 (see FIG. 5, etc.) is configured to, before the maintenance timing comes near, display symbols indicating the maintenance items and remaining periods (remaining days or remaining travel distances) until the maintenance timing.

CITATION LIST

Patent Literature

PTL 1: Japanese Laid-Open Patent Application Publication No. 2008-308075

SUMMARY OF INVENTION

Technical Problem

The display device of PTL 1 displays the information pieces about the maintenance items and the information pieces about the remaining periods at all times. Therefore, users who do not need maintenance related information pieces until the maintenance timing comes near feel troublesome in some cases since the plural maintenance related information pieces are displayed at all times.

Further, as with the display device of PTL 1, when providing a display portion dedicated for displaying the maintenance related information pieces, such display portion which is hardly necessary when the maintenance timing is not near is typically configured to be small. In this case, there is a problem that it is difficult to display both the information pieces about the maintenance items and the information pieces about the remaining periods in a small display space in an easy-to-understand manner.

For example, according to the display device of PTL 1, the information piece about the maintenance item is displayed by a symbol constituted by one numeric character or one alphabetical character, and this achieves space saving. However, it is difficult for users to understand which symbol corresponds to which maintenance item.

An object of the present invention is to provide a display device of a vehicle, the display device being capable of: when a maintenance timing is not near, suppressing troublesomeness felt by users by display of maintenance related information pieces; and when the maintenance timing comes near, displaying the maintenance related information pieces in an easy-to-understand manner.

Solution to Problem

To solve the above problems, a display device of a vehicle according to the present invention is configured as below.

A first aspect of the present invention of the present application is a display device of a vehicle, the display device including a display portion configured to display maintenance related information pieces about a plurality of maintenance items of the vehicle, the display portion including: a first display portion configured to, when at least one of the plurality of maintenance items is in a predetermined maintenance period, display the maintenance related information piece about the maintenance item that is in the predetermined maintenance period, the predetermined maintenance period including a predetermined maintenance timing and periods before and after the predetermined maintenance timing; and a second display portion configured to, when none of the plurality of maintenance items is in the maintenance period, display only the information piece about a nearest one of the maintenance timings of the plurality of maintenance items.

In the present specification, the wording "maintenance timing" denotes a timing appropriate for performing maintenance, and the wording "maintenance period" denotes a period appropriate for performing maintenance, i.e., a predetermined period from a timing before the maintenance timing until a timing after the maintenance timing.

Further, in the present specification, an index indicating the "maintenance timing" and the "maintenance period" is not limited to a "time." The index may be a "vehicle travel distance," a "deterioration degree" of oil or a part, or the like, or a combination of plural types of indices may be used. When plural types of indices are used as the indices indicating the "maintenance timing" and the "maintenance period," the information pieces about the nearest maintenance timing may be displayed for respective indices at the second display portion, or only one information piece about the nearest maintenance timing may be displayed by using only one type of index after conversion and comparison are performed among the indices.

Further, in the present specification, regarding the wording "nearest maintenance timing," when there exists a maintenance item whose maintenance timing has passed, the maintenance timing of this maintenance item is regarded as the nearest maintenance timing. Further, when there exist a plurality of maintenance items whose maintenance timings have passed, the maintenance timing which has passed at an earliest timing among those maintenance timings is regarded as the nearest maintenance timing.

A second aspect of the present invention is configured such that in the first aspect of the present invention, the information piece about the maintenance timing displayed at the second display portion is a remaining period until the maintenance timing.

In the present specification, the index indicating the wording "remaining period" is not limited to a "time" as with the "maintenance timing" and the "maintenance period." The index may be a "vehicle travel distance," a "deterioration degree" of oil or a part, or the like, or a combination of plural types of indices may be used.

A third aspect of the present invention is configured such that the first or second aspect of the present invention further includes an operating portion configured to switch display of the first display portion, wherein in accordance with an operation of the operating portion, the first display portion displays which one of the plurality of maintenance items corresponds to the information piece displayed at the second display portion.

A fourth aspect of the present invention is configured such that in any one of the first to third aspects of the present invention, the plurality of maintenance items include a periodic inspection, a tire rotation, and an oil change.

A fifth aspect of the present invention is configured such that: in any one of the first to fourth aspects of the present invention, the first display portion is a center display unit provided at a vehicle body width direction middle portion of an instrument panel arranged in front of a front seat of the vehicle; and the second display portion is a maintenance timing display portion provided at a meter display portion located in front of a steering wheel of the front seat of the vehicle.

A sixth aspect of the present invention is configured such that in the fifth aspect of the present invention, in addition to the maintenance timing display portion, provided at the meter display portion are: a water temperature display portion configured to display a temperature of an engine cooling water; and a remaining fuel amount display portion configured to display an amount of fuel remaining in a fuel tank.

ADVANTAGEOUS EFFECTS OF INVENTION

According to the first aspect of the present invention, when none of the maintenance items is in the maintenance period, the next maintenance timing can be confirmed by the information piece displayed at the second display portion. In addition, since only the information piece about the nearest maintenance timing is displayed at the second display portion, troublesomeness felt by display of excessive maintenance related information pieces can be suppressed. Further, when at least one of the maintenance items is in the maintenance period, the information piece about the maintenance item that is in the maintenance period can be confirmed by the display of the first display portion.

According to the second aspect of the present invention, when none of the maintenance items is in the maintenance period, the next maintenance timing can be confirmed from the information piece about the remaining period displayed at the second display portion. In addition, since information pieces other than the information piece about the remaining period are not displayed at the second display portion, troublesomeness felt by a user by the display of the second display portion can be suppressed.

According to the third aspect of the present invention, when a user wants to confirm which one of the maintenance items corresponds to the information piece displayed at the second display portion, the user can switch the display of the first display portion by the operation of the operating portion to find out which one of the maintenance timings of the maintenance items is the nearest.

According to the fourth aspect of the present invention, since the information pieces about the periodic inspection, the tire rotation, and the oil change are displayed at the first and second display portions as above, the above effects regarding the maintenance can be obtained.

According to the fifth aspect of the present invention, the center display unit displays the maintenance related information pieces. On the other hand, the meter display portion which is located in front of the steering wheel and easy to get into a view field of a driver displays only the information piece about the nearest maintenance timing when none of the maintenance items is in the maintenance period. Therefore, troublesomeness felt by a user by the display of excessive maintenance related information pieces can be suppressed.

According to the sixth aspect of the present invention, since the meter display portion also displays information pieces other than the maintenance related information pieces, a display region of the maintenance timing display portion is narrow. However, since the maintenance timing display portion displays only the information piece about the nearest maintenance timing, a driver can sufficiently recognize the information piece.

DESCRIPTION OF EMBODIMENTS

Hereinafter, an embodiment of the present invention will be explained in reference to the attached drawings.

Figure 1:
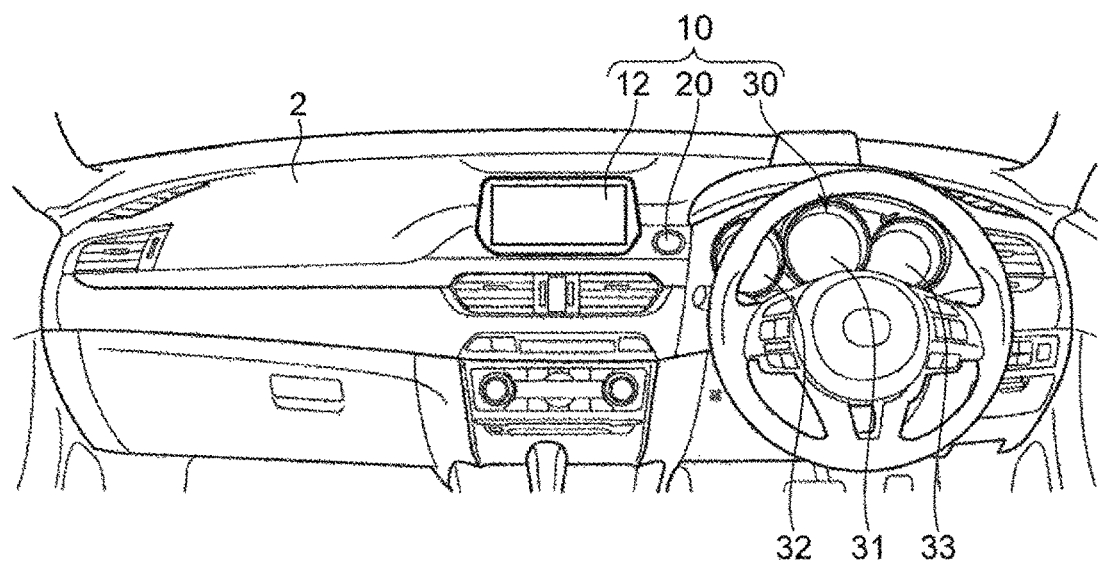
FIG. 1 is a diagram showing an instrument panel at which a display device of a vehicle according to an embodiment of the present invention is provided.

As shown in FIG. 1, a display device 10 of a vehicle according to the present embodiment is provided at an instrument panel 2 arranged in front of a front seat of the vehicle. The display device 10 includes: a center display unit 12 provided at a vehicle body width direction middle portion of the instrument panel 2; a center display unit operating portion 20 used for a switching operation of display of the center display unit 12; and a meter display unit 30 provided at a portion of the instrument panel 2, the portion being located in front of a driver's seat.

Figure 2:
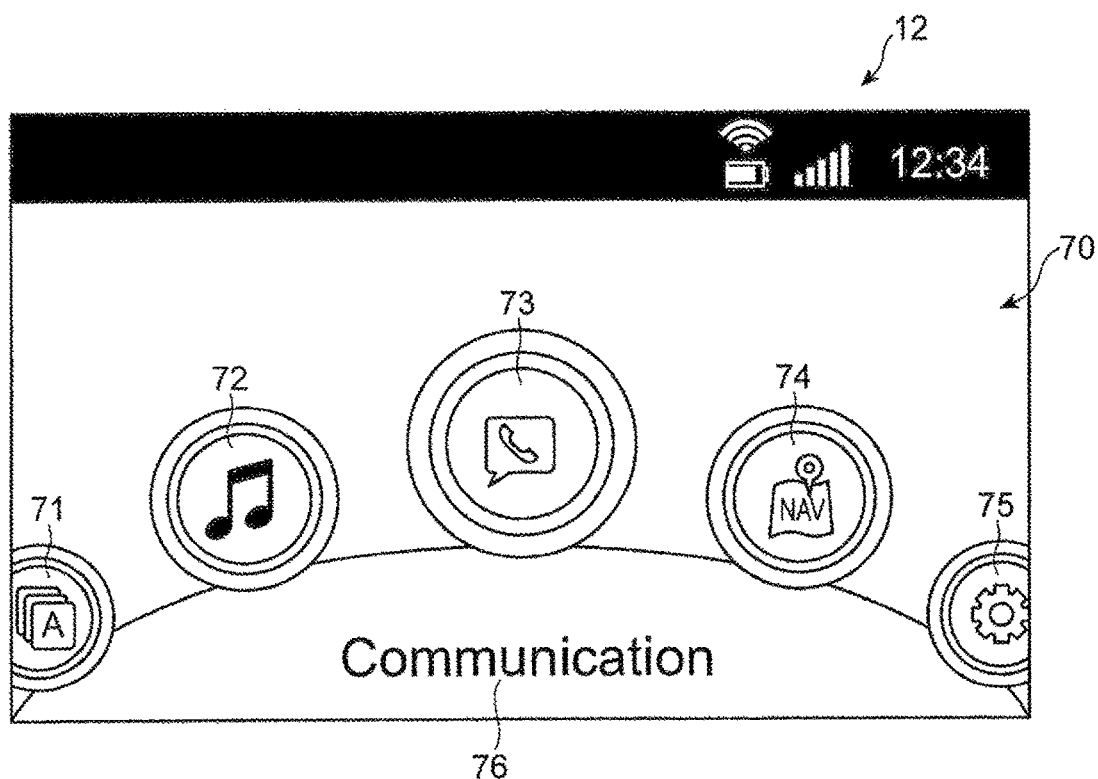
FIG. 2 is a diagram showing a home screen image of a center display unit.

FIG. 2 shows one example of the center display unit 12. The center display unit 12 is constituted by, for example, a liquid crystal display device. In a state shown in FIG. 2, a home screen image 70 is displayed at the center display unit 12. The home screen image 70 displays: a plurality of command buttons 71, 72, 73, 74, and 75 (71 to 75) for displaying various screen images; and a name 76 of the screen image corresponding to the command button 71, 72, 73, 74, or 75 selected by an operation of the operating portion 20.

As specific examples of the command buttons 71 to 75, the home screen image 70 displays: the command button 71 for displaying an application screen image 171 (see FIG. 13); the command button 72 for displaying an entertainment screen image (not shown); the command button 73 for displaying a communication screen image (not shown); the command button 74 for displaying a navigation screen image (not shown); and the command button 75 for displaying a setting screen image (not shown). When the command button 71, 72, 73, 74, or 75 is selected and executed by the operation of the operating portion 20, the display on the center display unit 12 is switched to the screen image corresponding to the executed command button 71, 72, 73, 74, or 75.

Figure 3:
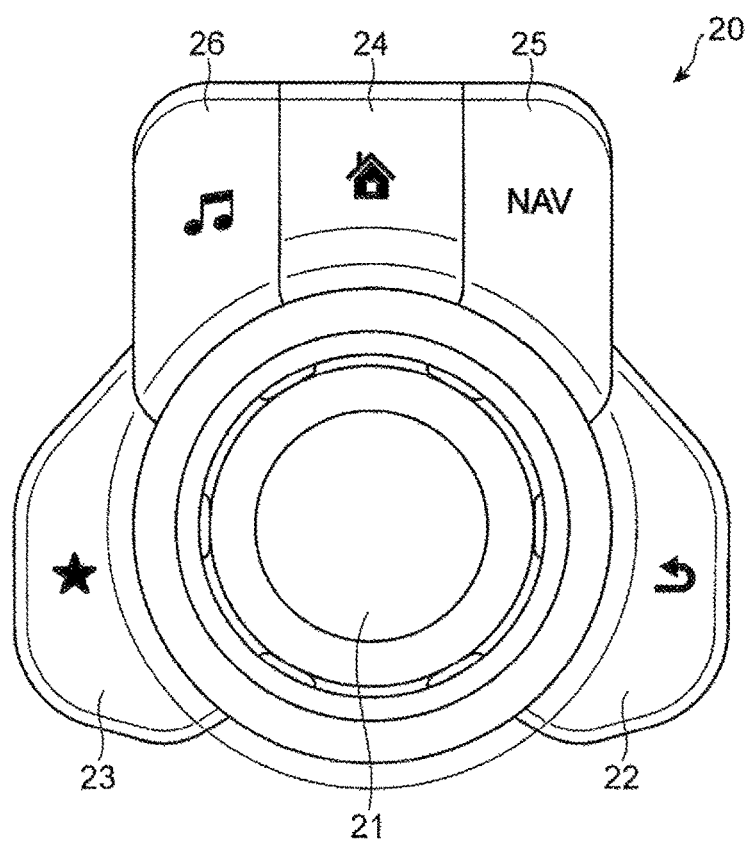
FIG. 3 is a diagram showing a center display unit operating portion.

FIG. 3 shows one example of the operating portion 20. The operating portion 20 shown in FIG. 3 includes: a commander knob 21 used when selecting and determining items; a return button 22 for returning to a previous screen image; a favorites button 23 for displaying favorites; a home button 24 for returning to the home screen image 70 (see FIG. 2); a navigation button 25 for displaying the navigation screen image (not shown); and an entertainment button 26 for displaying the entertainment screen image (not shown).

Items on various screen images can be selected by a rotating operation of the commander knob 21 or an upward, downward, leftward, or rightward tilting operation of the commander knob 21. The selected item is determined by a pushing operation of the commander knob 21.

It should be noted that the configuration of the operating portion 20 shown in FIG. 3 is just one example, and a specific configuration of the operating portion 20 is not especially limited.

Figure 4:
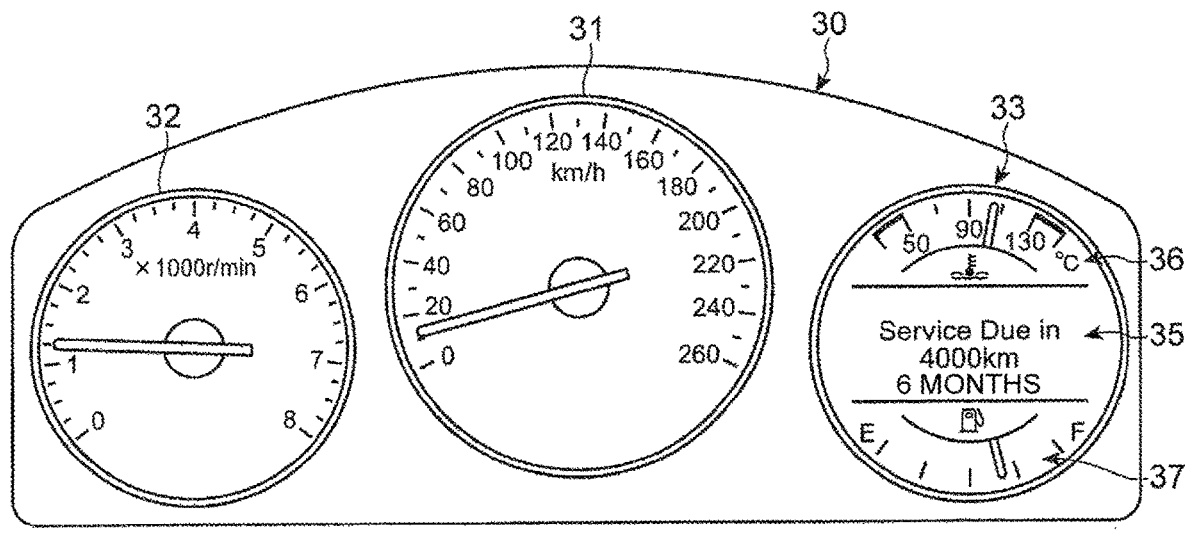
FIG. 4 is a diagram showing a meter display unit.

FIG. 4 shows one example of the meter display unit 30. The meter display unit 30 shown in FIG. 4 is constituted by, for example, a liquid crystal display device and includes a first meter display portion 31, a second meter display portion 32, and a third meter display portion 33. Each of the meter display portions 31, 32, and 33 is formed in, for example, a circular shape.

The first meter display portion 31 is provided at a middle portion of the meter display unit 30 and is constituted by, for example, a vehicle speed display portion configured to display a vehicle speed. The second meter display portion 32 is provided at a left side of the first meter display portion 31 in the meter display unit 30 and is constituted by, for example, a tachometer display portion configured to display a rotation speed of an engine.

The third meter display portion 33 is, for example, divided into three parts in a vehicle body upward/downward direction. A maintenance timing display portion 35 configured to display information pieces about a maintenance timing of the vehicle is provided at a vehicle body upward/downward direction middle portion of the third meter display portion 33. A water temperature display portion 36 configured to display a temperature of engine cooling water is provided at a portion of the third meter display portion 33, the portion being located at an upper side of the maintenance timing display portion 35. A remaining fuel amount display portion 37 configured to display the amount of fuel remaining in a fuel tank is provided at a portion of the third meter display portion 33, the portion being located at a lower side of the maintenance timing display portion 35.

Figure 5:
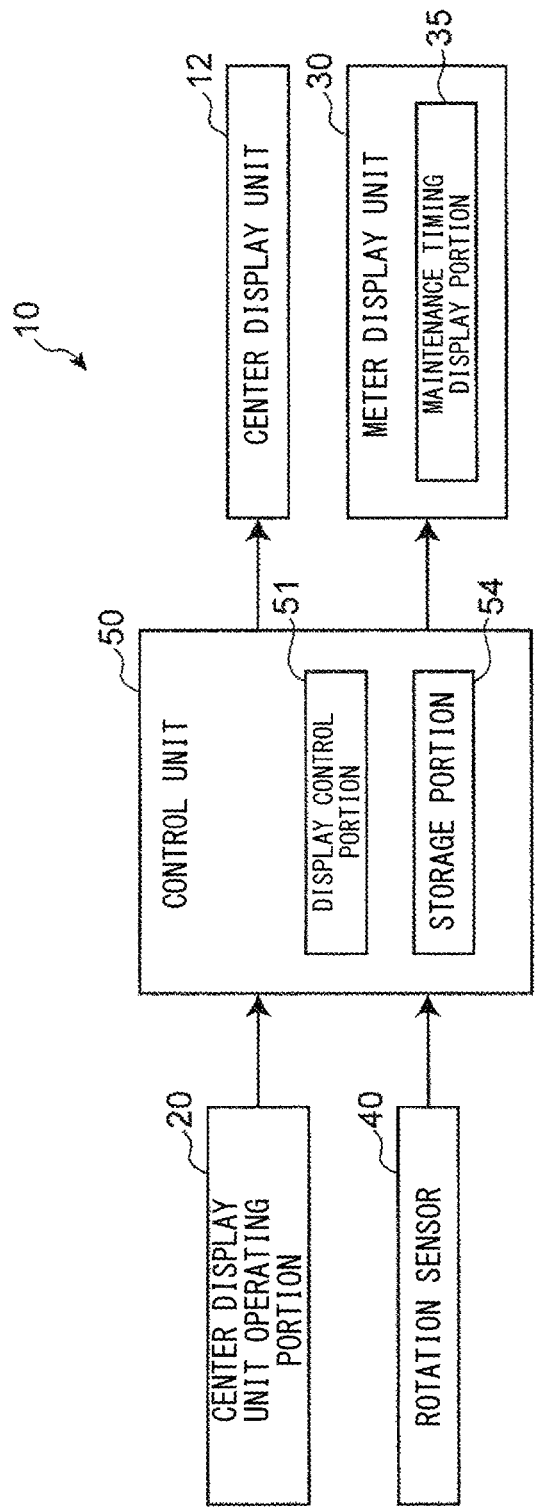
FIG. 5 is a diagram showing a control system of the display device of the vehicle according to the embodiment of the present invention.

As shown in FIG. 5, the display device 10 further includes a control unit 50, and the control unit 50 includes a display control portion 51 as a control portion and a storage portion 54 storing various information pieces. It should be noted that the storage portion 54 may be constituted by an external device connected to the control unit 50.

Signals from the operating portion 20, a rotation sensor 40 of an accumulated travel distance meter, and the like are input to the control unit 50. The rotation sensor 40 detects a rotation speed of a drive shaft, an output shaft of a transmission, or the like. A travel distance of the vehicle is calculated based on an output value of the rotation sensor 40.

The display control portion 51 controls the display of the center display unit 12 as a first display portion and the display of the meter display unit 30 as a second display portion based on: information pieces based on the various signals input to the control unit 50; and the information pieces stored in the storage portion 54.

The below-described application screen image 171 (see FIG. 13), a below-described maintenance screen image 275 (see FIG. 14), or the like is displayed at the center display unit 12 based on a control signal from the control unit 50. Each of these screen images displays information pieces (hereinafter referred to as "maintenance related information pieces") about maintenance regarding a plurality of maintenance items of the vehicle. Examples of the maintenance related information pieces displayed at the center display unit 12 include information pieces about the maintenance items, information pieces about the maintenance timings, and information pieces informing that the maintenance item is in a maintenance period.

Based on the control signal from the control unit 50, the maintenance timing display portion 35 displays only the information piece about the maintenance timing among the maintenance related information pieces. Specifically, the maintenance timing display portion 35 displays only the information piece about a nearest one of the maintenance timings of the plurality of maintenance items. More specifically, the information piece about the maintenance timing displayed at the maintenance timing display portion 35 is a remaining period until the maintenance timing.

Types of the maintenance items displayed at the center display unit 12 and the maintenance timing display portion 35 are not especially limited. In the present embodiment, the maintenance related information pieces about a periodic inspection, a tire rotation, and an oil change are displayed at the center display unit 12 and the maintenance timing display portion 35.

As information pieces used for display control by the display control portion 51, the storage portion 54 stores, for each maintenance item, (i) a next maintenance timing set by the operation of the operating portion 20, (ii) a maintenance period calculated based on the next maintenance timing, (iii) a time and an accumulated travel distance when previous maintenance was performed, (iv) an elapsed period from the previous maintenance, (v) and the like.

In the present embodiment, a "time" and a "vehicle travel distance" are used as indices indicating the "maintenance timing," the "maintenance period," the "remaining period," and the "elapsed period from the previous maintenance," and one or both of the "time" and the "vehicle travel distance" are used for each maintenance item.

Figure 6:
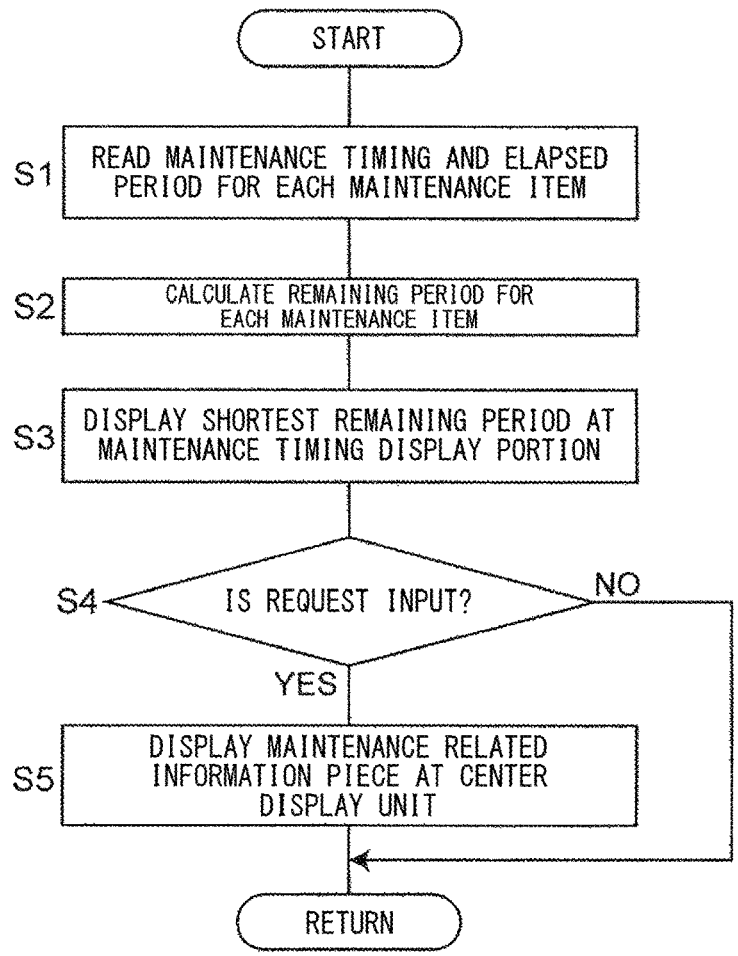
FIG. 6 is a flow chart showing a control example of the control system shown in FIG. 5.

A control example by the display control portion 51 will be briefly explained in reference to FIG. 6.

According to the control example shown in FIG. 6, first, in Step S1, the information pieces stored in the storage portion 54 about the next maintenance timing and the elapsed period from the previous maintenance are read for each maintenance item.

In Step S2, based on the information pieces read in Step S1, the remaining period until the next maintenance timing is calculated for each maintenance item.

In Step S3, only a shortest one of the remaining periods calculated in Step S2 is displayed at the maintenance timing display portion 35. A specific display example at the maintenance timing display portion 35 will be explained later.

In Step S4, it is determined whether or not the operation of the operating portion 20 has been performed so as to request the display of the maintenance related information piece at the center display unit 12. When it is determined in Step S4 that such operation of the operating portion 20 has been performed, the maintenance related information piece is displayed at the center display unit 12 in Step S5.

By the above display control, when none of the maintenance items is in the maintenance period, the next maintenance timing can be known by seeing the shortest remaining period displayed at the maintenance timing display portion 35. In addition, since the maintenance timing display portion 35 displays only the shortest remaining period, troublesomeness felt by the display of excessive maintenance related information pieces when none of the maintenance items is in the maintenance period can be reduced.

When, for example, it is found by the display of the maintenance timing display portion 35 that at least one of the maintenance items is in the maintenance period, the maintenance related information piece about the maintenance item that is in the maintenance period can be displayed at the center display unit 12 by operating the operating portion 20 according to need. Therefore, which one of the maintenance timings of the maintenance items is the nearest can be suitably known by the display of the center display unit 12.

A specific example of the display of the maintenance timing display portion 35 will be explained in reference to FIGS. 7 to 12.

Figure 7:
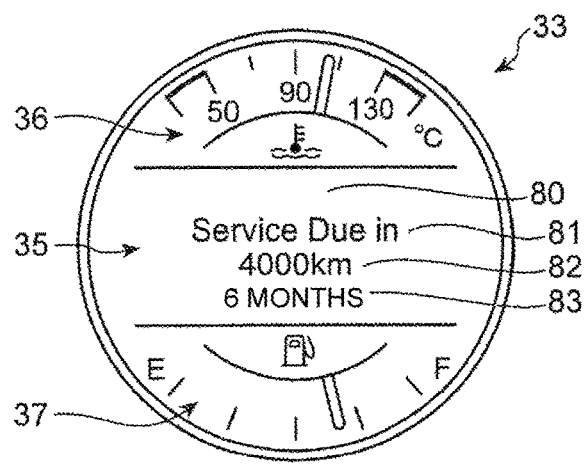
FIG. 7 is a diagram showing a display example of a maintenance timing display portion when a maintenance timing is not near.

FIG. 7 shows a display example of the maintenance timing display portion 35 when none of the maintenance items is in the maintenance period. As shown in FIG. 7, the maintenance timing display portion 35 includes: an informing display portion 80 configured to inform that at least one of the maintenance items is in the maintenance period; a nearness degree display portion 81 configured to display a nearness degree until the maintenance timing; a shortest remaining travel distance display portion 82 configured to display a shortest one of remaining travel distances until the respective maintenance timings set by using a vehicle travel distance as an index; and a shortest remaining time display portion 83 configured to display a shortest one of remaining times until the respective maintenance timings set by using a time as an index.

The informing display portion 80, the nearness degree display portion 81, the shortest remaining travel distance display portion 82, and the shortest remaining time display portion 83 are arranged in the maintenance timing display portion 35 so as to be lined up in this order from an upper side in an upward/downward direction.

Figure 8:
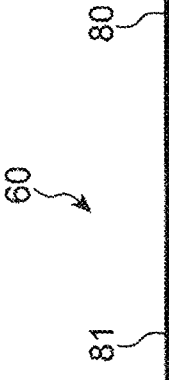
FIG. 8 is a diagram showing one example of a table used for display control of the maintenance timing display portion.

The display of the informing display portion 80 and the display of the nearness degree display portion 81 are controlled based on, for example, a table 60 shown in FIG. 8. It should be noted that an information piece about the table 60 is stored in the storage portion 54 in advance.

In the table 60 shown in FIG. 8, display contents of the informing display portion 80 and display contents of the nearness degree display portion 81 are set in accordance with the nearness degree until the maintenance timing. The nearness degree is set in four stages that are Levels 1 to 4. Regarding the nearness degree, Level 4 denotes a stage in which the maintenance timing has come or has passed. Level 3 denotes a stage in which a first near timing that is near the maintenance timing has passed, but the maintenance timing has not come yet. Level 2 denotes a stage which is before the first near timing and in which a second near timing at which the maintenance period starts has passed, and the first near timing has not come yet. Level 1 denotes a stage in which the second near timing has not come yet.

When the vehicle travel distance is used as the index of the remaining period, the remaining travel distance corresponding to Level 1 of the nearness degree is 1,001 km or more. The remaining travel distance corresponding to Level 2 of the nearness degree falls within a range of 201 km or more and 1,000 km or less. The remaining travel distance corresponding to Level 3 of the nearness degree falls within a range of 1 km or more and 200 km or less. The remaining travel distance corresponding to Level 4 of the nearness degree is 0 km or less. It should be noted that the first decimal place of the remaining travel distance is rounded.

On the other hand, when the time is used as the index of the remaining period, the remaining time corresponding to Level 1 of the nearness degree is 16 days or more. The remaining time corresponding to Level 2 of the nearness degree falls within a range of 4 days or more and 15 days or less. The remaining time corresponding to Level 3 of the nearness degree falls within a range of 1 day or more and 3 days or less. The remaining time corresponding to Level 4 of the nearness degree is 0 day or less.

Figure 9:
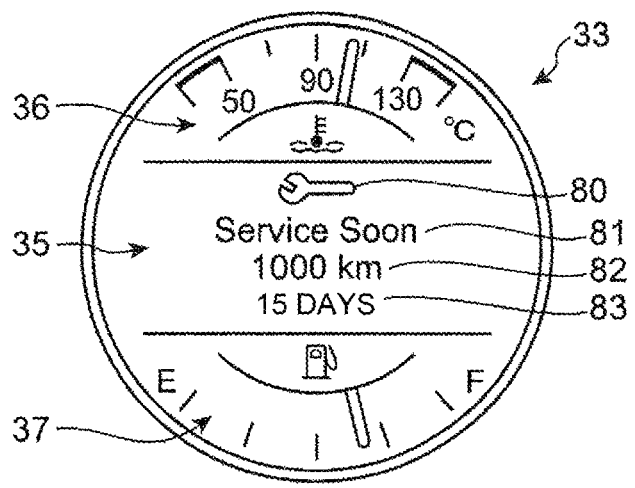
FIG. 9 is a diagram showing a display example of the maintenance timing display portion when the maintenance timing comes near.
Figure 10:
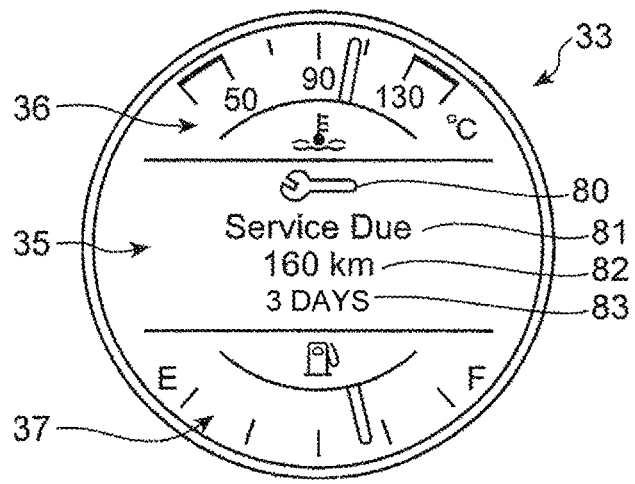
FIG. 10 is a diagram showing a display example of the maintenance timing display portion when the maintenance timing is about to pass.

When the nearness degree is Level 1, and none of the maintenance items is in the maintenance period, the nearness degree display portion 81 displays words "Service Due in" as shown in FIG. 7. When the nearness degree is Level 2, and at least one of the maintenance items is in the maintenance period, the nearness degree display portion 81 displays words "Service Soon" as shown in FIG. 9. When the nearness degree is Level 3, and at least one of the maintenance timings of the maintenance items is about to pass, the nearness degree display portion 81 displays words "Service Due" as shown in FIG. 10. When the nearness degree is Level 4, and at least one of the maintenance timings of the maintenance items has come or has passed, the nearness degree display portion 81 displays words "Service Past Due" as shown in FIG. 11.

Figure 11:
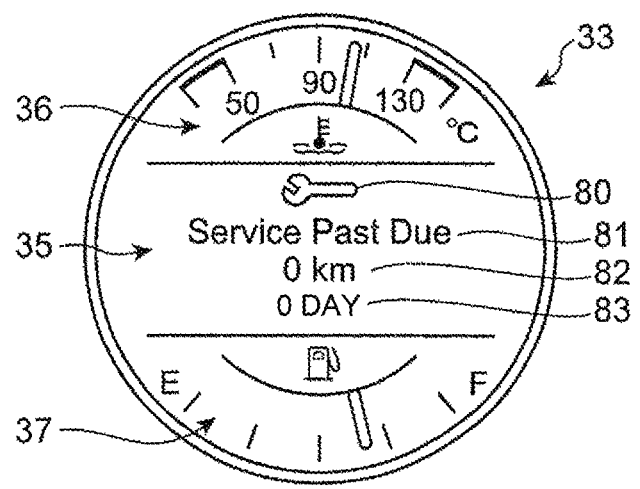
FIG. 11 is a diagram showing a display example of the maintenance timing display portion when the maintenance timing has passed.

In the informing display portion 80, display for informing that at least one of the maintenance items is in the maintenance period is not performed when the nearness degree is Level 1 (see FIG. 7) but is performed when the nearness degree is Level 2, 3, or 4 (see FIGS. 9 to 11). A mode of the display for informing at the informing display portion 80 is not especially limited. For example, by pop-up display of a wrench mark shown in FIGS. 9 to 11, the informing display portion 80 informs that at least one of the maintenance items is in the maintenance period.

Regardless of the nearness degree, at least one of the shortest remaining travel distance display portion 82 and the shortest remaining time display portion 83 displays the shortest remaining period at all times. In the examples shown in FIGS. 7 and 9 to 11, each of both the shortest remaining travel distance display portion 82 and the shortest remaining time display portion 83 displays the shortest remaining period. In this case, the shortest one of the remaining travel distances obtained by using the vehicle travel distance as the index of the remaining period is displayed at the shortest remaining travel distance display portion 82, and the shortest one of the remaining times obtained by using the time as the index of the remaining period is displayed at the shortest remaining time display portion 83.

When only one of the vehicle travel distance and the time is used as the index of the remaining period, only the remaining period of this index is displayed at the shortest remaining travel distance display portion 82 or the shortest remaining time display portion 83. Further, even when both the vehicle travel distance and the time are used as the indices of the remaining periods, the remaining periods indicated by these indices may be converted based on a common index and be compared with each other, and then, only a shortest one of the converted remaining periods may be displayed at the shortest remaining travel distance display portion 82 or the shortest remaining time display portion 83.

Figure 12:
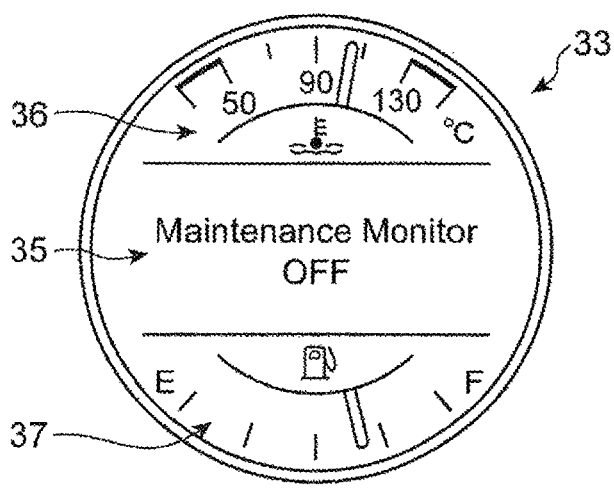
FIG. 12 is a diagram showing a display example of the maintenance timing display portion when display setting of a remaining period is in an off state.

The Display of the remaining period at the maintenance timing display portion 35 can be set to an off state. When the display of the remaining period is set to the off state, the maintenance timing display portion 35 displays words "Maintenance Monitor OFF" as shown in FIG. 12, for example. It should be noted that at this time, the maintenance timing display portion 35 may display nothing.

A specific example of the display of the maintenance related information pieces at the center display unit 12 will be explained in reference to FIGS. 2 and 13 to 17.

Figure 13:
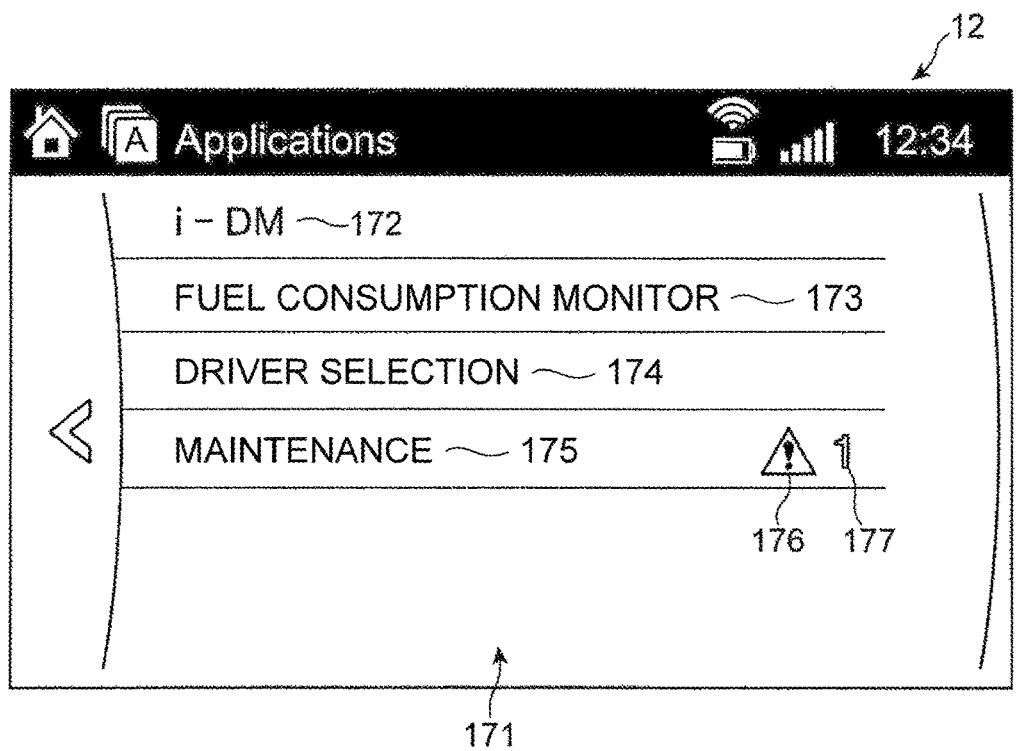
FIG. 13 is a diagram showing one example of an application screen image of the center display unit.

When the command button 71 is executed on the home screen image 70 shown in FIG. 2, the application screen image 171 shown in FIG. 13 is displayed at the center display unit 12. The application screen image 171 displays a plurality of item buttons 172, 173, 174, and 175 including a maintenance item button 175.

When there exists the maintenance item which is in the maintenance period, the maintenance item button 175 displays: an image 176 informing that there exists the maintenance item(s) which is in the maintenance period; and an image 177 showing the number of maintenance items which are in the maintenance periods. With this, by opening the application screen image 171 on the center display unit 12 by the operation of the operating portion 20, a user can confirm: whether or not there exists the maintenance item(s) which is in the maintenance period; and the number of maintenance items which are in the maintenance periods.

Figure 14:
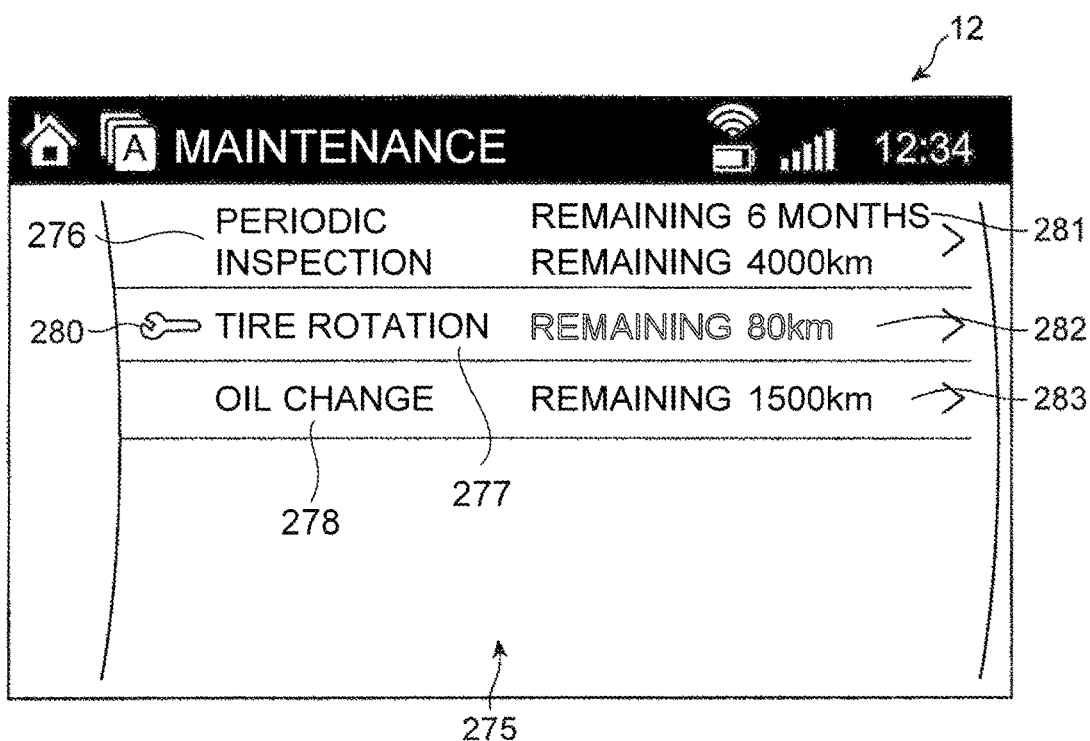
FIG. 14 is a diagram showing one example of a maintenance screen image of the center display unit.

When the maintenance item button 175 is selected and determined on the application screen image 171 shown in FIG. 13 by the operation of the operating portion 20, the maintenance screen image 275 shown in FIG. 14 is displayed. The maintenance screen image 275 displays item buttons 276, 277, and 278 for respective maintenance items. In the present embodiment, the maintenance screen image 275 displays a periodic inspection item button 276, a tire rotation item button 277, and an oil change item button 278.

In the maintenance screen image 275 shown in FIG. 14, the item buttons 276, 277, and 278 are provided with respective remaining period display portions 281, 282, and 283. With this, by opening the maintenance screen image 275 by the operation of the operating portion 20, the user can confirm the remaining periods of all the maintenance items. In the example shown in FIG. 14, the remaining period display portion 281 of the periodic inspection item button 276 displays both the remaining travel distance and the remaining time, and each of the remaining period display portion 282 of the tire rotation item button 277 and the remaining period display portion 283 of the oil change item button 278 displays only the remaining travel distance.

When the maintenance item corresponding to the item button 276, 277, or 278 is in the maintenance period, an image 280 informing that the maintenance item is in the maintenance period is displayed at the maintenance screen image 275, and the remaining period of the maintenance item that is in the maintenance period is displayed at the remaining period display portion 281, 282, or 283 in a mode that is different from a mode when the maintenance item is not in the maintenance period. In the example shown in FIG. 14, the tire rotation is in the maintenance period. Therefore, the image 280 of the wrench mark is displayed at the tire rotation item button 277, and the remaining period is displayed in red at the remaining period display portion 282. Therefore, by opening the maintenance screen image 275 by the operation of the operating portion 20, the user can confirm the maintenance item corresponding to the shortest remaining period displayed at the maintenance timing display portion 35.

Figure 15:
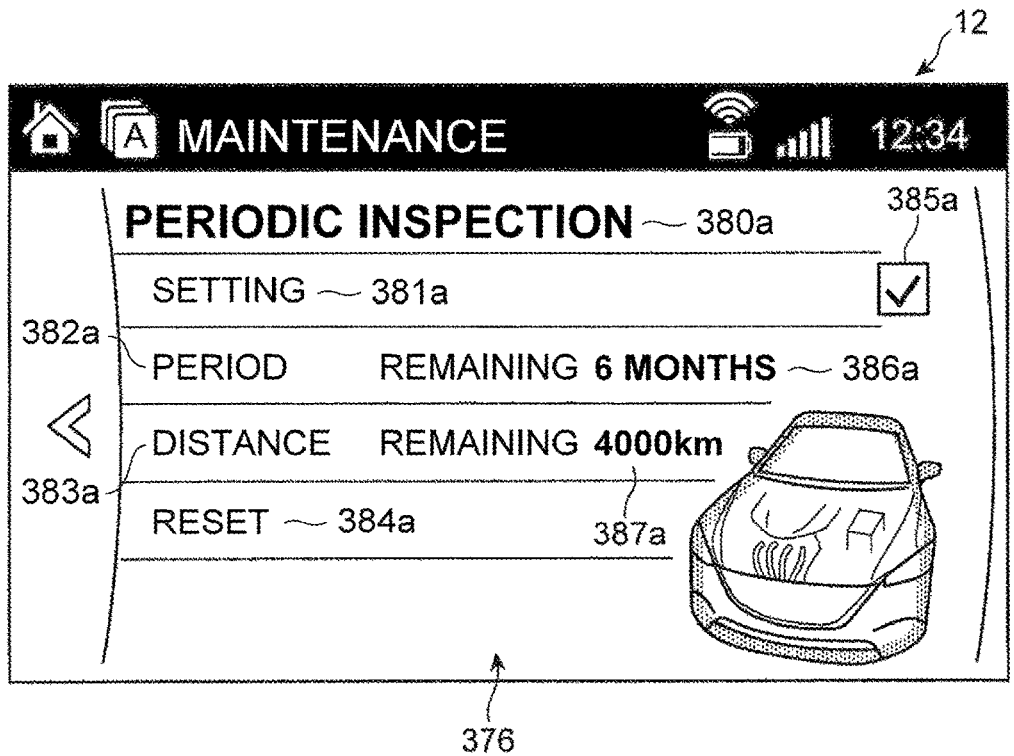
FIG. 15 is a diagram showing one example of a screen image of the center display unit, the screen image being displayed for performing display setting of a remaining period until a periodic inspection.
Figure 16:
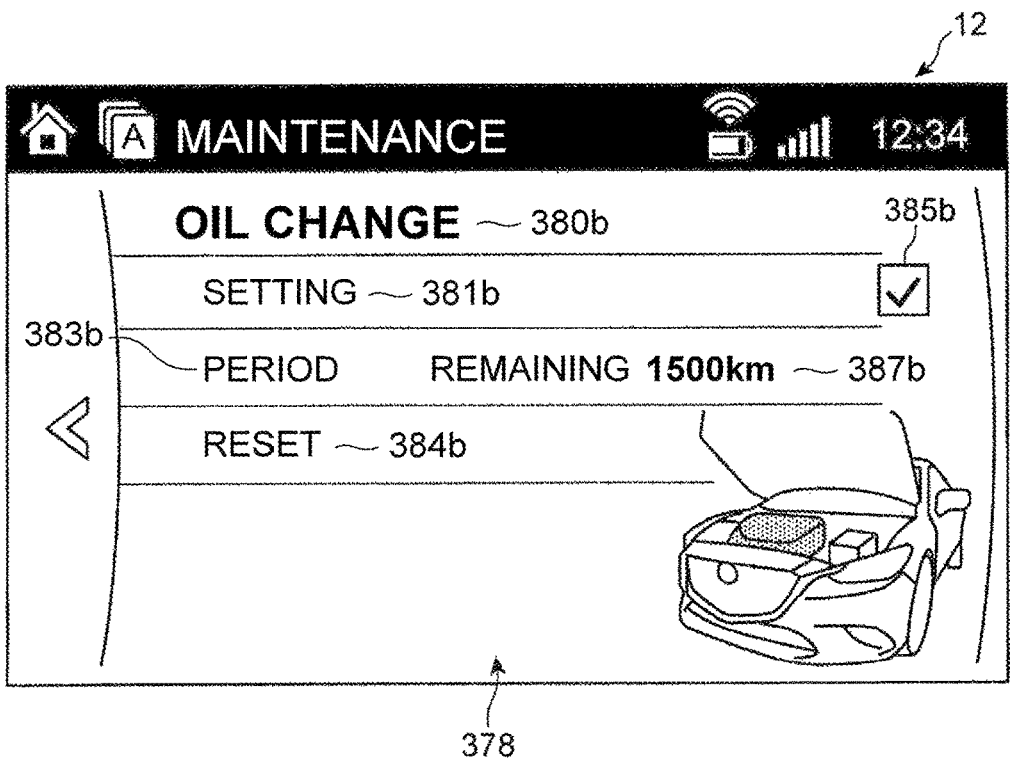
FIG. 16 is a diagram showing one example of a screen image of the center display unit, the screen image being displayed for performing display setting of a remaining period until an oil change.
Figure 17:
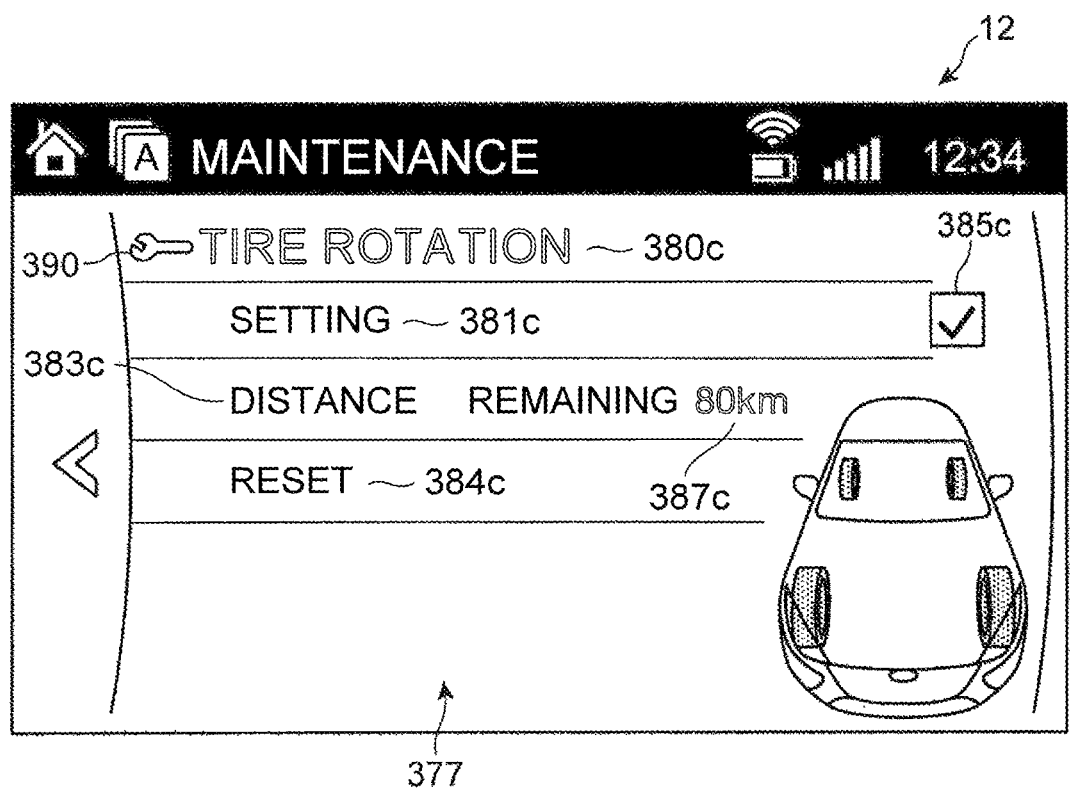
FIG. 17 is a diagram showing one example of a screen image of the center display unit, the screen image being displayed for performing display setting of a remaining period until a tire rotation.

When any one of the item buttons 276, 277, and 278 is selected and determined on the maintenance screen image 275 shown in FIG. 14 by the operation of the operating portion 20, a setting screen image 376, 377, or 378 (see FIGS. 15 to 17) of the corresponding maintenance item is displayed. Specifically, when the periodic inspection item button 276 is selected and determined on the maintenance screen image 275, the periodic inspection setting screen image 376 shown in FIG. 15 is displayed. When the oil change item button 278 is selected and determined, the oil change setting screen image 378 shown in FIG. 16 is displayed. When the tire rotation item button 277 shown in FIG. 14 is selected and determined, the tire rotation setting screen image 377 shown in FIG. 17 is displayed. On the setting screen images 376, 377, and 378, setting of the display of the information pieces about the maintenance timings at the center display unit 12 and the maintenance timing display portion 35 can be performed.

The periodic inspection setting screen image 376 shown in FIG. 15 displays: a title display portion 380a showing that the image is the setting screen image for the periodic inspection; an on/off set button 381a for turning on or off display setting of the information piece about the maintenance timing of the periodic inspection at the center display unit 12 and the maintenance timing display portion 35; a remaining time set button 382a for setting the remaining time until the maintenance timing; a remaining travel distance set button 383a for setting the remaining travel distance until the maintenance timing; and a reset button 384a for resetting the setting of the remaining period to an initial value.

The on/off set button 381a is provided with an on/off display portion 385a. When the display of the information piece about the maintenance timing of the periodic inspection is set to an on state, a check mark is displayed at the on/off display portion 385a, and when it is set to an off state, the check mark is not displayed. By selecting and determining the on/off set button 381a by the operation of the operating portion 20, the display setting of the information piece about the maintenance timing of the periodic inspection can be turned on or off The remaining time set button 382a is provided with a remaining period display portion 386a, and the remaining travel distance set button 383a is provided with a remaining period display portion 387a. The remaining period display portion 386a of the remaining time set button 382a displays the remaining time, and the remaining period display portion 387a of the remaining travel distance set button 383a displays the remaining travel distance. With the remaining time set button 382a or the remaining travel distance set button 383a selected by the operation of the operating portion 20, the remaining period can be increased or decreased. In accordance with this setting, the remaining periods displayed at the remaining period display portions 386a and 387a and the maintenance timing display portion 35 are increased or decreased.

When the reset button 384a is executed by the operation of the operating portion 20, the setting of the remaining period is reset to an initial value. Normally, the reset button 384a is executed after the maintenance.

Similarly, the oil change setting screen image 378 shown in FIG. 16 displays a title display portion 380b, an on/off set button 381b, a remaining travel distance set button 383b, and a reset button 384b. The on/off set button 381b is provided with an on/off display portion 385b, and the remaining travel distance set button 383b is provided with a remaining period display portion 387b. The oil change setting screen image 378 can perform setting similar to the periodic inspection setting screen image 376.

Further, the tire rotation setting screen image 377 shown in FIG. 17 also displays a title display portion 380c, an on/off set button 381c, a remaining travel distance set button 383c, and a reset button 384c. The on/off set button 381c is provided with an on/off display portion 385c, and the remaining travel distance set button 383c is provided with a remaining period display portion 387c. The tire rotation setting screen image 377 can perform setting similar to the periodic inspection setting screen image 376.

In the tire rotation setting screen image 377 shown in FIG. 17, since the tire rotation is in the maintenance period, a title is displayed at the title display portion 380c in a mode that is different from a mode when the tire rotation is not in the maintenance period, and an image 390 informing that the tire rotation is in the maintenance period is displayed. Further, the remaining period is displayed at the remaining period display portion 387c in a mode that is different from a mode when the tire rotation is not in the maintenance period. Therefore, whether or not each of the maintenance items is in the maintenance period can be confirmed on the setting screen image 376, 377, or 378.

The foregoing has explained the present invention using the above embodiment. However, the present invention is not limited to the above embodiment.

The present embodiment has explained an example in which the "time" and the "vehicle travel distance" are used as the indices indicating the "maintenance timing," the "maintenance period," the "remaining period," and the "elapsed period." However, various indices, such as "deterioration degrees" of oil and parts may be used, and a combination of plural types of indices may be used.

The above embodiment has explained an example in which the maintenance items whose maintenance related information pieces are displayed at the display device of the vehicle are the periodic inspection, the tire rotation, and the oil change. However, the present invention is also applicable to various vehicle maintenance items other than the above.

INDUSTRIAL APPLICABILITY

As above, according to the present invention, when the maintenance timing is not near, troublesomeness felt by a user by the display of the maintenance related information piece can be suppressed, and when the maintenance timing comes near, the maintenance related information piece can be displayed in an easy-to-understand manner. Therefore, the present invention may be suitably utilized in the field of manufacturing industry of a display device configured to display an information piece about maintenance of a vehicle.

LIST OF REFERENCE CHARACTERS 2 instrument panel
10 display device of vehicle
12 center display unit (first display portion)
20 center display unit operating portion (operating portion)
30 meter display unit
31 first meter display portion
32 second meter display portion
33 third meter display portion
35 maintenance timing display portion (second display portion)
36 water temperature display portion
37 remaining fuel amount display portion
40 rotation sensor
50 control unit
51 display control portion
54 storage portion

The invention claimed is:

1. A display device of a vehicle, the display device comprising:
   a center display unit provided at a middle portion of an instrument panel in a vehicle body width direction; and
   a meter display unit provided separately from the center display unit and located in front of a steering wheel, wherein
   the center display unit displays all remaining periods until maintenance timings of a plurality of maintenance items of the vehicle regardless of whether or not the plurality of maintenance items are in respective maintenance periods,
   the center display unit, when at least one maintenance item is within its respective maintenance period, displays an image indicating that the maintenance item is within its respective maintenance period,
   the meter display unit, when none of the plurality of maintenance items are in their respective maintenance periods, displays only a shortest remaining period of all of the remaining periods, and
   the meter display unit does not display the plurality of maintenance items.

2. The display device according to claim 1, further comprising an operating portion configured to switch display of the center display unit, wherein
   in accordance with an operation of the operating portion, the center display unit displays which one of the plurality of maintenance items corresponds to the shortest remaining period displayed at the meter display unit.

3. The display device according to claim 1, wherein the plurality of maintenance items comprise a periodic inspection, a tire rotation, and an oil change.

4. The display device according to claim 1, wherein the meter display unit further displays:
   a temperature of an engine cooling water; and
   an amount of fuel remaining in a fuel tank.

\* \* \* \* \*